US006414822B1

(12) United States Patent
Crane et al.

(10) Patent No.: US 6,414,822 B1
(45) Date of Patent: Jul. 2, 2002

(54) MAGNETIC MICROACTUATOR (75) Inventors: Peter Crane, Richfield; Wayne Allen Bonin, North Oaks; Bo Zhang, Bloomington, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/315,006

(22) Filed: May 19, 1999

Related U.S. Application Data
(60) Provisional application No. 60/089,010, filed on Jun. 11, 1998.

(51) Int. Cl.$^7$ ............................. G11B 21/20; G11B 5/55
(52) U.S. Cl. ..................................................... 360/294.5
(58) Field of Search ............................. 360/294, 294.1, 360/294.2, 294.3, 294.4, 294.5, 294.6, 245.3, 245.4, 264.5, 78.05

(56) References Cited

U.S. PATENT DOCUMENTS

| 3,678,482 A | 7/1972 | Billawala ................. 340/174.1 |
| 3,924,268 A | 12/1975 | McIntosh et al. ............. 360/78 |

(List continued on next page.)

FOREIGN PATENT DOCUMENTS

| EP | 0 412 221 B1 | 11/1989 |
| JP | 63-122069 | 5/1988 |
| JP | 2-263369 | 4/1989 |
| JP | 4-134681 | 5/1992 |
| JP | 4-368676 | 12/1992 |
| JP | 5-094682 | 4/1993 |
| JP | 6-020412 | 1/1994 |
| JP | 7-085621 | 3/1995 |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.
"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.
"A Flexural Piggyback Milli–Actuator for Over 5 Gbit/in$^2$ Density Magnetic Recording" by Koganezawa et al, *IEEE Transactions on Magneticss*, vol. 32, No. 5, Sep. 1996.
"Transverse Mode Electrostatic Microactuator for MEMS–Based HDD Slider" by Imamura et al, *IEEE* 1996.
"An Experiment for Head Positioning System Using Sub-micron Track–width GMR Head" by Yoshikawa et al., *IEEE Transactions on Magnetics*, vol. 32, No. 5, Sep. 1996.

(List continued on next page.)

Primary Examiner—David L. Ometz
(74) Attorney, Agent, or Firm—Kinney & Lange, P.A.

(57) ABSTRACT

A dual-stage actuation assembly for a disc drive includes a movable actuator arm controlled by an actuator motor. A suspension assembly is supported by the actuator arm, and includes a flexure. A microactuator is also provided, including a stator attached to the flexure and a rotor supporting the slider, the rotor being movable with respect to the stator in a first horizontal plane generally parallel to a surface of the disc. A vertically arranged magnetic circuit is formed, which in an exemplary embodiment includes a bottom ferromagnetic keeper, a plurality of magnets, a patterned conductive coil and atop ferromagnetic keeper, those elements being vertically arranged in different horizontal planes. The magnets are operable to move laterally and thereby cause movement of the microactuator rotor in the first horizontal plane generally parallel to the surface of the disc in response to circulation of a current through the patterned conductive coil.

18 Claims, 10 Drawing Sheets

U.S. PATENT DOCUMENTS

| | | | | |
|---|---|---|---|---|
| 4,374,402 A | 2/1983 | Blessom et al. | ............. | 360/104 |
| 4,605,977 A | 8/1986 | Matthews | ................... | 360/103 |
| 4,620,251 A | 10/1986 | Gitzendanner | ............. | 360/103 |
| 4,651,242 A | 3/1987 | Hirano et al. | ............... | 360/103 |
| 4,764,829 A | 8/1988 | Makino | ...................... | 360/106 |
| 4,853,810 A | 8/1989 | Pohl et al. | .................. | 360/103 |
| 4,914,725 A | 4/1990 | Belser et al. | ............... | 318/560 |
| 5,021,906 A | 6/1991 | Chang et al. | ............... | 360/103 |
| 5,034,828 A | 7/1991 | Ananth et al. | ................ | 360/75 |
| 5,065,268 A | 11/1991 | Hagen | ........................ | 360/104 |
| 5,073,242 A | 12/1991 | Hamilton | .............. | 204/192.22 |
| 5,079,659 A | 1/1992 | Hagen | ........................ | 360/104 |
| 5,105,408 A | 4/1992 | Lee et al. | ................ | 369/44.15 |
| 5,163,218 A | 11/1992 | Hamilton | ..................... | 29/603 |
| 5,174,012 A | 12/1992 | Hamilton | ..................... | 29/603 |
| 5,177,652 A | 1/1993 | Yamaguchi et al. | ..... | 360/78.05 |
| 5,189,578 A | 2/1993 | Mori et al. | ................. | 360/106 |
| 5,255,016 A | 10/1993 | Usui et al. | ................. | 346/140 |
| 5,276,573 A | 1/1994 | Harada et al. | .............. | 360/103 |
| 5,303,105 A | 4/1994 | Jorgenson | ................... | 360/106 |
| 5,483,025 A | 1/1996 | Hamilton et al. | ........... | 174/254 |
| 5,521,778 A | 5/1996 | Boutaghou | ................. | 360/105 |
| 5,552,809 A | 9/1996 | Hosono et al. | ............... | 347/10 |
| 5,560,097 A | 10/1996 | Bajhorek et al. | ........ | 29/603.12 |
| 5,623,461 A | 4/1997 | Sohmuta | ..................... | 369/32 |
| 5,657,188 A | 8/1997 | Jurgenson et al. | .......... | 360/106 |
| 5,745,319 A | 4/1998 | Takekado et al. | ........ | 360/78.05 |
| 5,764,444 A | 6/1998 | Imamura et al. | ............ | 360/109 |
| 5,781,381 A | 7/1998 | Koganezawa et al. | ...... | 360/106 |
| 5,793,571 A | 8/1998 | Jurgenson et al. | .......... | 360/104 |
| 5,796,558 A | 8/1998 | Hanrahan et al. | ........... | 360/106 |
| 5,802,701 A | 9/1998 | Fontana et al. | .......... | 29/603.14 |
| 5,805,382 A | 9/1998 | Lee et al. | ................... | 360/104 |
| 5,867,347 A | 2/1999 | Knight et al. | ............... | 360/104 |
| 5,896,246 A | 4/1999 | Budde et al. | ............... | 360/104 |
| 5,898,541 A | 4/1999 | Boutaghou et al. | ......... | 360/109 |
| 5,898,554 A | 4/1999 | Krinke et al. | ............... | 360/104 |
| 5,936,805 A | * 8/1999 | Imaino | .................... | 360/294.3 |
| 6,061,208 A | * 5/2000 | Hattori | .................... | 360/294.3 |
| 6,078,473 A | * 6/2000 | Crane et al. | ............. | 360/294.6 |
| 6,122,149 A | * 9/2000 | Zhang et al. | ............ | 360/294.5 |
| 6,195,227 B1 | * 2/2001 | Fan et al. | ................ | 360/294.3 |
| 6,295,185 B1 | * 9/2001 | Stefansky | ................ | 360/264.5 |

OTHER PUBLICATIONS

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuators Compensating for Off–Track Errors in Magnetic Disk Drives" by Imamura et al, *Advance Information Storage Systems*, vol. 5, pp 119–125.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3–1/2 Inch Inline HDD Using Multilayer Piezoelectric Load/Unload Mechanisn" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, vol. 4, N.

* cited by examiner

MAGNETIC MICROACTUATOR

CROSS-REFERENCE TO RELATED APPLICATION(S)

This application claims priority from Provisional Application No. 60/089,010 filed Jun. 11, 1998, for "Moving Magnet Micro-Actuator With Coil on Flex Circuit" by P. Crane, W. Bonin and B. Zhang.

BACKGROUND OF THE INVENTION

The present invention relates to a disc drive microactuator, and more particularly to a magnetic microactuator utilizing a vertical magnetic circuit contained on a substrate and a flex circuit to provide microactuation force.

The density of concentric data tracks on magnetic discs continues to increase (that is, the size of data tracks and radial spacing between data tracks are decreasing), requiring more precise radial positioning of the head. Conventionally, head positioning is accomplished by operating an actuator arm with a large-scale actuation motor, such as a voice coil motor, to radially position a head on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

One promising approach for high resolution head positioning involves employing a high resolution microactuator in addition to the conventional lower resolution actuator motor, thereby effecting head positioning through dual-stage actuation. Various microactuator designs have been considered to accomplish high resolution head positioning. One design involves inserting a silicon-based thin film structure between the suspension and the slider in a disc drive assembly. A major technical challenge in implementing such a microactuator is to provide sufficiently large actuation force to overcome spring bias forces to drive the head at a speed high enough to accommodate the required bandwidth. Such a design must be realized in a relatively small wafer area, to keep costs reasonable and to allow easy integration into the disc drive design.

Therefore, there is a need in the art for a microactuator design providing large actuation force with reasonable power consumption and within a reasonable wafer area to microposition a transducing head at a speed that accommodates the high bandwidth required by high performance disc drives.

BRIEF SUMMARY OF THE INVENTION

The present invention is a dual-stage actuation assembly for a disc drive having a recording disc rotatable about an axis and a slider supporting a transducing head for transducing data with the disc. The dual-stage actuation assembly includes a movable actuator arm controlled by an actuator motor. A suspension assembly is supported by the actuator arm, and includes a flexure. A microactuator is also provided, including a stator attached to the flexure and a rotor supporting the slider, the rotor being movable with respect to the stator in a first horizontal plane generally parallel to a surface of the disc. A magnetic circuit is arranged vertically in a plurality of planes substantially parallel to the first horizontal plane to move the microactuator rotor in the first horizontal plane generally parallel to the surface of the disc in response to a current provided to the magnetic circuit. In an exemplary embodiment, the magnetic circuit includes a bottom ferromagnetic keeper, a plurality of magnets, a patterned conductive coil and a top ferromagnetic keeper, vertically arranged in different horizontal planes. The magnets are operable to move laterally and thereby cause movement of the microactuator rotor in the first horizontal plane generally parallel to the surface of the disc in response to circulation of a current through the patterned conductive coil.

Another aspect of the present invention is a method of forming a microactuator in a disc drive having a recording disc rotatable about an axis, a slider supporting a transducing head for transducing data with the disc, and an actuation system supporting the slider to coarsely position the transducing head adjacent a selected radial track of the disc. A microactuator substrate is formed with a plurality of outer preloading bars and a plurality of inner alignment clips that are movable with respect to the plurality of outer preloading bars. The alignment clips are suspended from the preloading bars by flexible beam springs. A tub is etched in the microactuator substrate, and a first ferromagnetic keeper is plated on a bottom surface of the tub. A plurality of magnets are formed on the first ferromagnetic keeper in the tub. A flexure is formed with a second ferromagnetic keeper and a patterned conductor on an underside of the flexure below the second ferromagnetic keeper. The flexure is attached to the microactuator substrate with the patterned conductor positioned between the plurality of magnets and the second ferromagnetic keeper.

DETAILED DESCRIPTION

Figure 1:
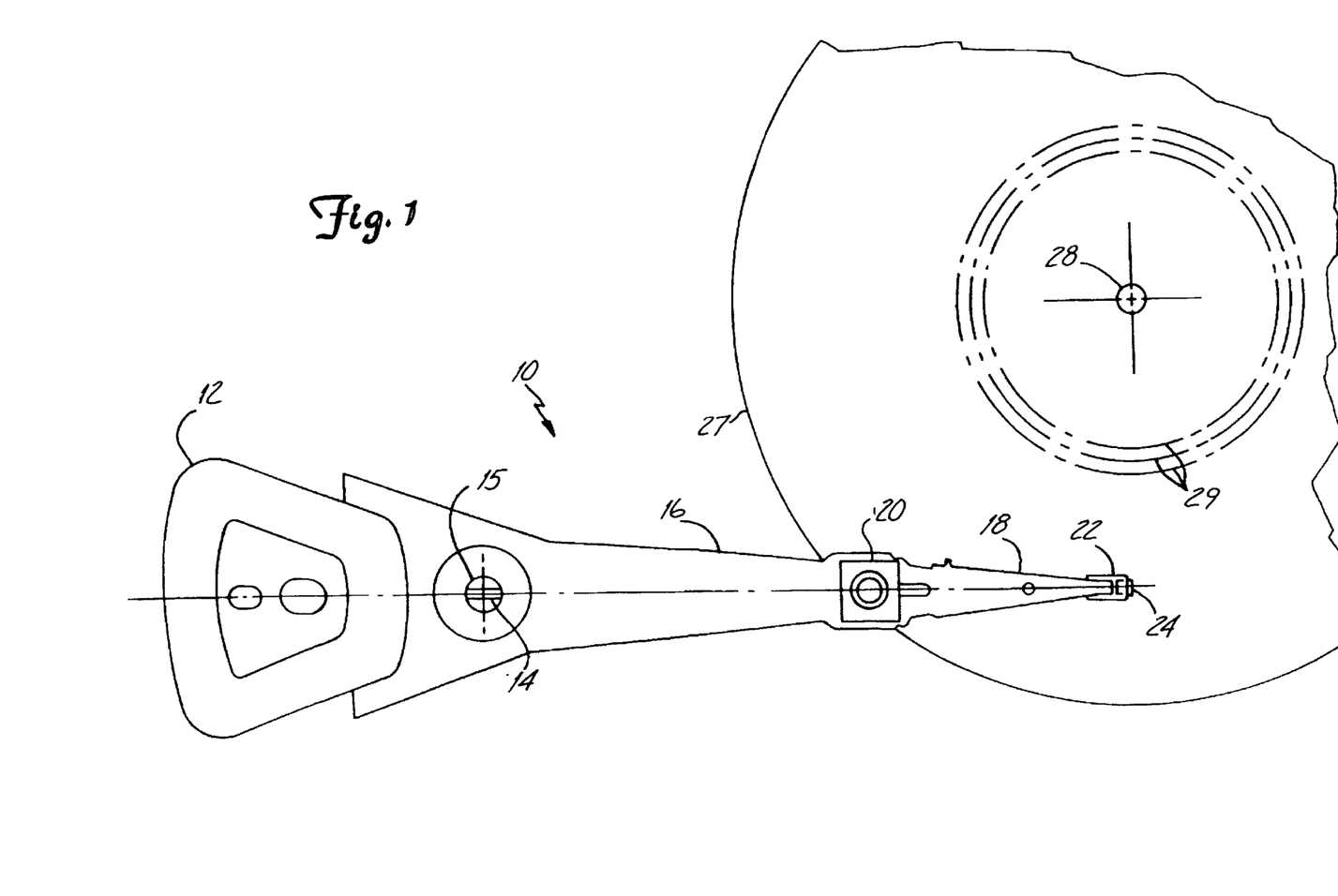
FIG. 1 is a plan view of a disc drive actuation system for positioning a slider over tracks of a disc.

FIG. 1 is a plan view of a disc drive actuation system 10 for positioning slider 24 over a track 29 of disc 27. Actuation system 10 includes voice coil motor (VCM) 12 arranged to rotate actuator arm 16 around axis 14 on spindle 15. Head suspension 18 is connected to actuator arm 16 at head mounting block 20. Flexure 22 is connected to an end of head suspension 18, and carries slider 24. Slider 24 carries a transducing head (not shown in FIG. 1) for reading and/or writing data on concentric tracks of disc 27. Disc 27 rotates around axis 28, so that windage is encountered by slider 24 to keep it aloft a small distance above the surface of disc 27.

VCM 12 is selectively operated to move actuator arm 16 around axis 14, thereby moving slider 24 between tracks 29 of disc 27. However, for disc drive systems with high track density, VCM 12 lacks sufficient resolution and frequency response to position a transducing head on slider 24 precisely over a selected track 29 of disc 27. Therefore, a higher resolution actuation device is necessary.

Figure 2:
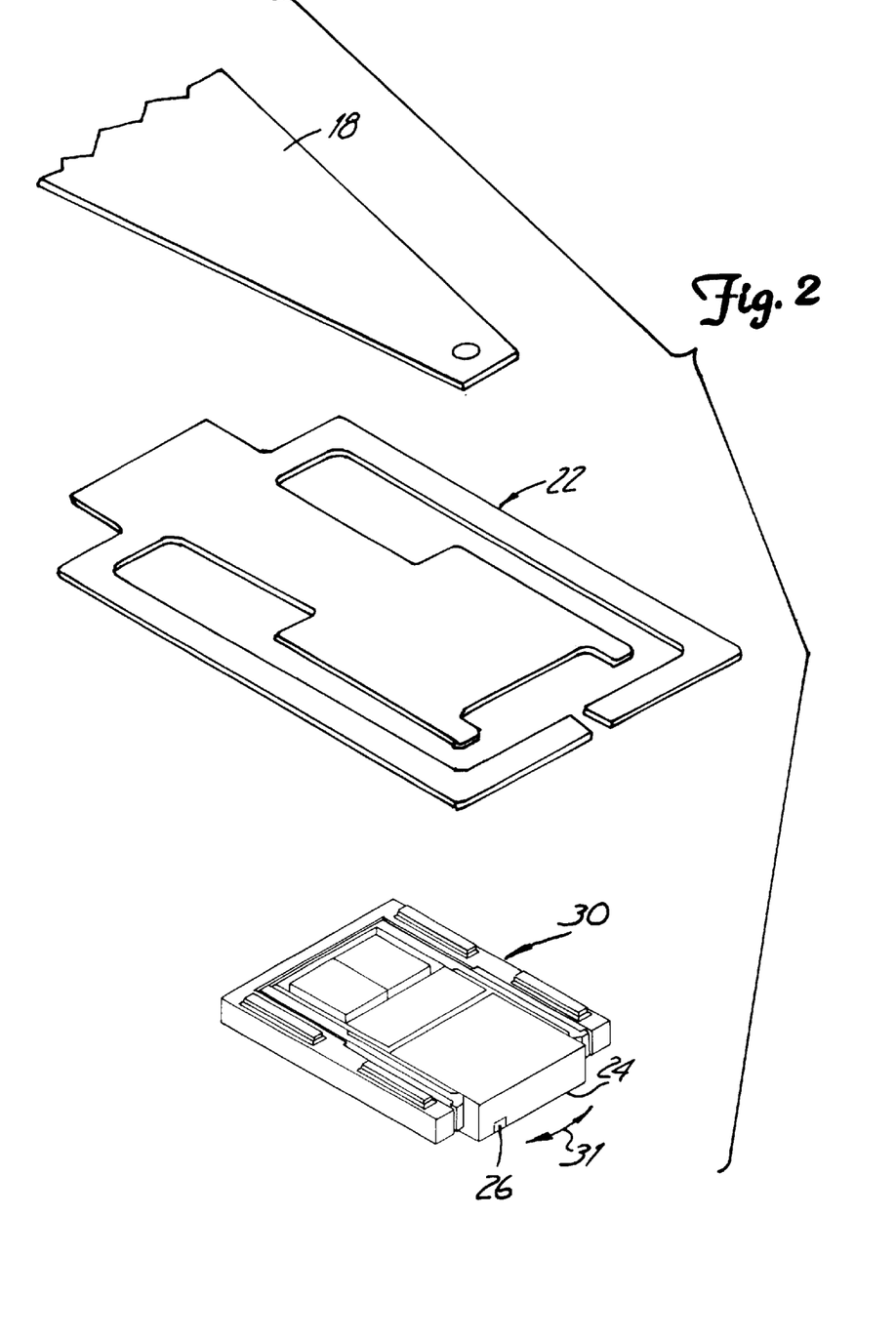
FIG. 2 is an exploded perspective view of a portion of a disc drive including a microactuator according to the present invention.

FIG. 2 is an exploded perspective view of a portion of a disc drive including microactuator 30 according to the present invention. Flexure 22 is attached to load beam 18, and microactuator 30 is attached to flexure 22 to carry slider 24 above a surface of disc 27 (FIG. 1). Transducing head 26 is carried by slider 24 to transduce data with the disc.

In operation of the disc drive, load beam 18, flexure 22 and microactuator 30 carrying slider 24 are all moved together as coarse positioning is performed by VCM 12 (FIG. 1) moving actuator arm 16 (FIG. 1). To achieve fine positioning of transducing head 26, microactuator 30 generates a force which causes bending of the beam springs of the microactuator. As a result, the portion of microactuator 30 carrying slider 24 moves slightly with respect to flexure 22 in the direction of arrows 31, displacing transducing head 26 with high resolution for precise positioning over a selected track of the disc.

Figure 3:
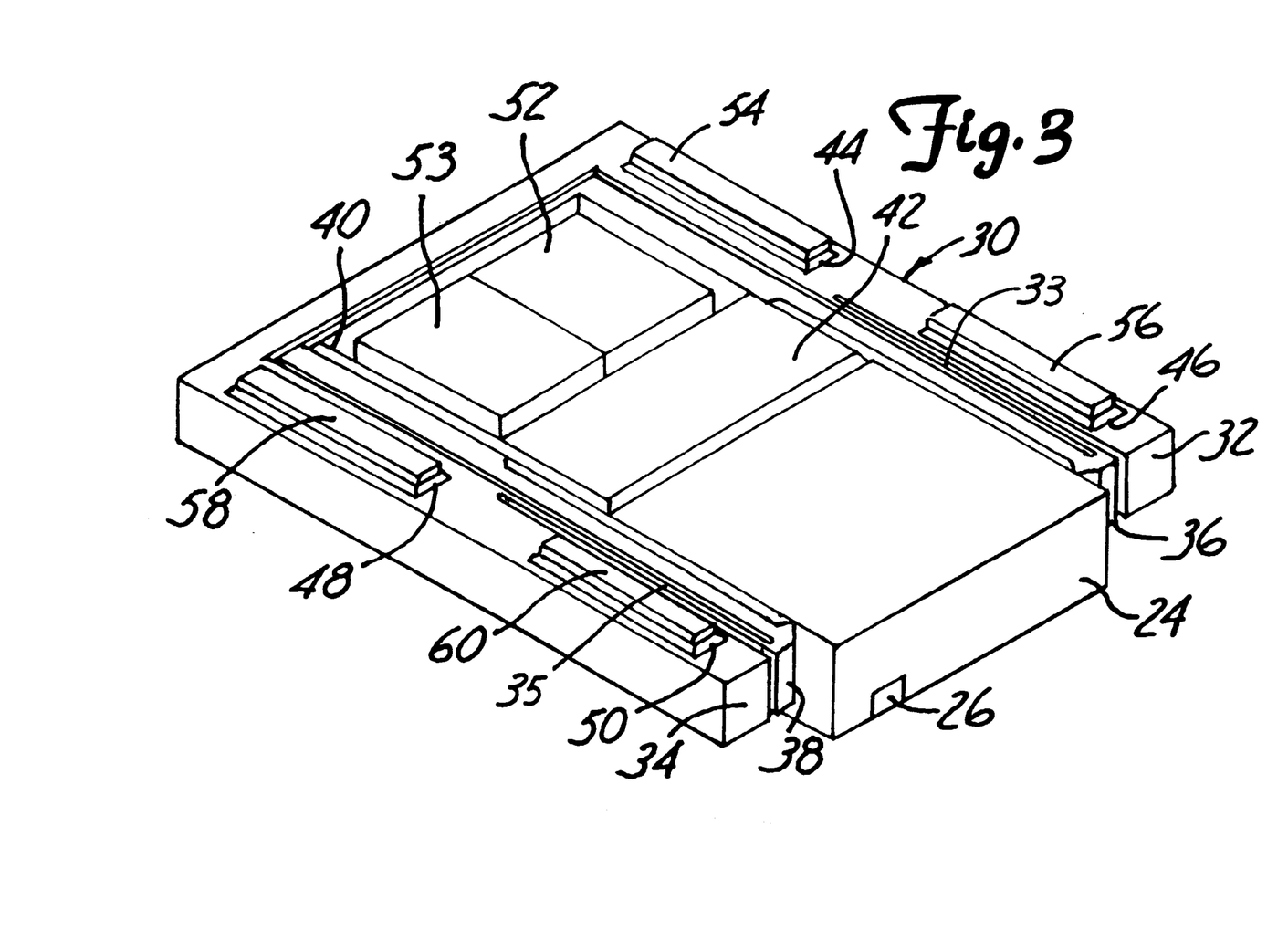
FIG. 3 is a perspective view of a microactuator system for positioning a slider over tracks of a disc.
Figure 4:
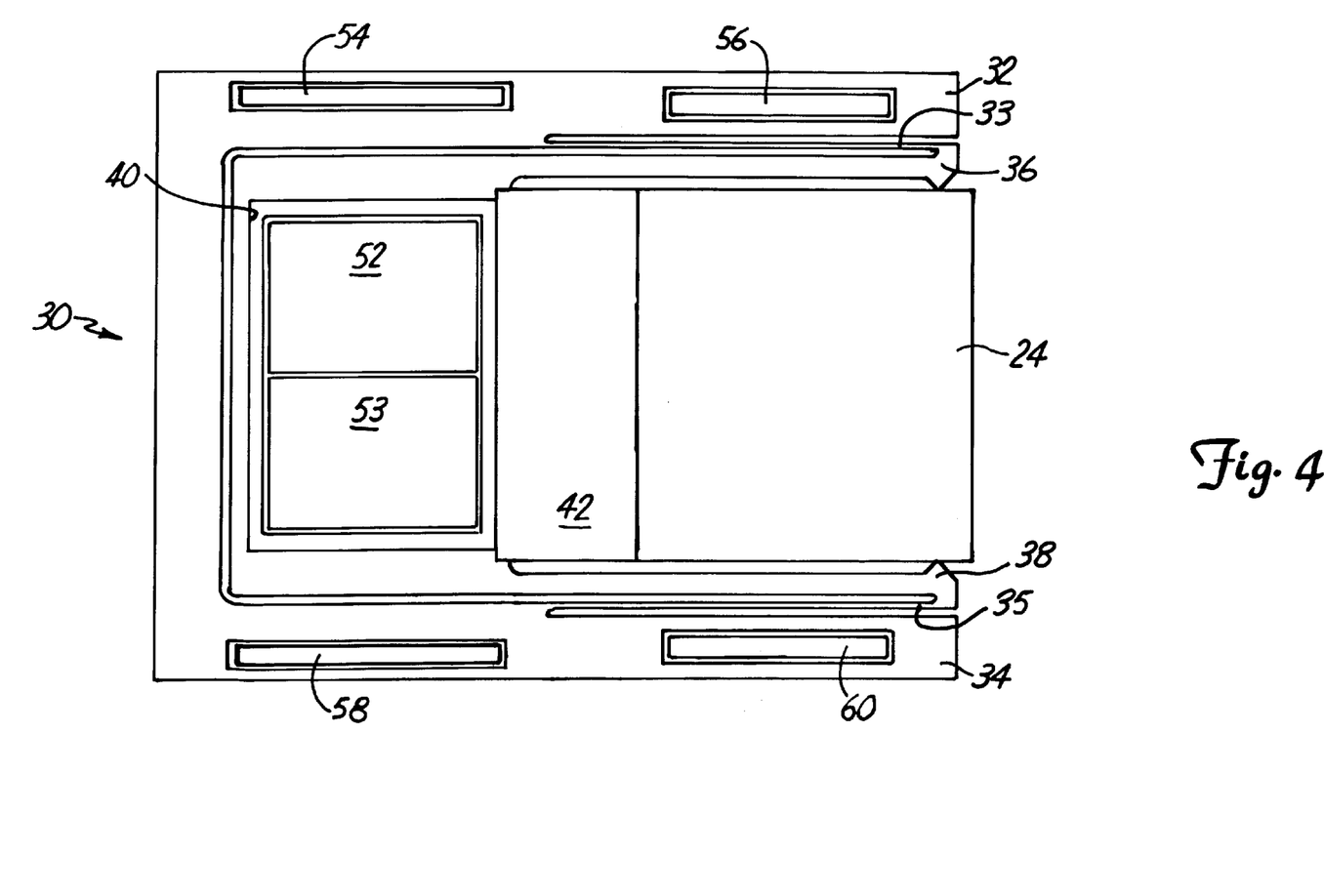
FIG. 4 is a top view of the microactuator system shown in FIG. 3.

FIG. 3 is a perspective view, and FIG. 4 is a top view, of microactuator 30 according to the present invention. Microactuator 30 includes outer preloading bars 32 and 34 and inner alignment clips 36 and 38, with inner alignment clips 36 and 38 clamping against the sides of slider 24 at a frontal portion (to the right in FIGS. 3 and 4) thereof. Flexible beam springs 33 and 35 extend between the proximal ends of preloading bars 32 and 34 and the distal ends of alignment clips 36 and 38. A tub 40 having a bottom surface lined with a ferromagnetic keeper material is formed in the substrate of microactuator 30 opposite transducing head 26 of slider 24, and structural bond pad 42 is provided for attachment to the top surface (opposite the air-bearing surface) of slider 24. Magnets 52 and 53 are located in tub 40, attached to the ferromagnetic lining on the bottom surface of tub 40. Standoffs 54, 56, 58 and 60 are formed on respective standoff bases 44, 46, 48 and 50 on outer preloading bars 32 and 34, to be borne upon so as to apply pre-load force to microactuator 30 as it supports slider 24 over the surface of the disc.

Figure 5:
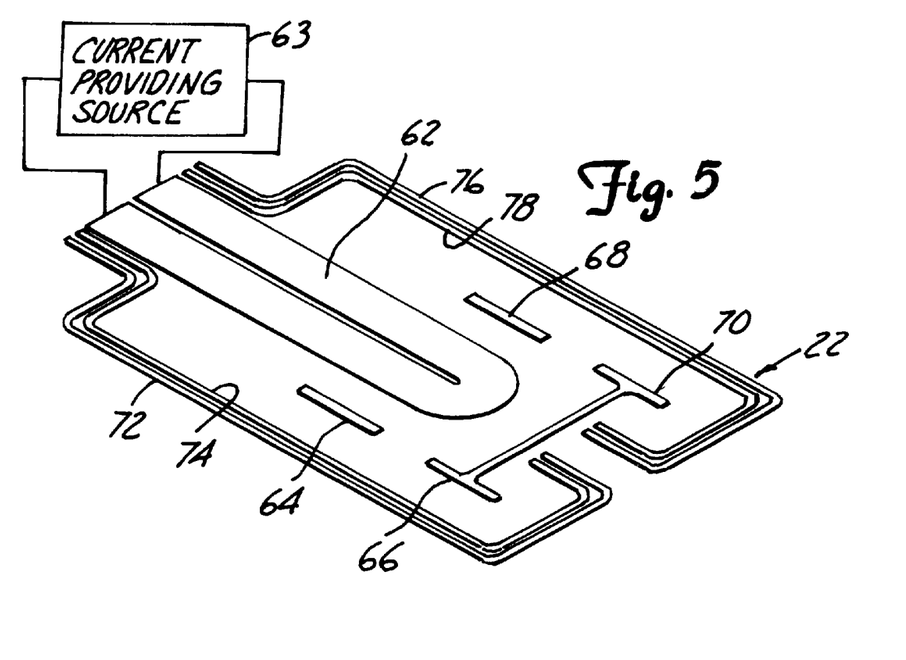
FIG. 5 is a perspective view of the underside of a flex circuit for use with the microactuator of the present invention.

FIG. 5 is a perspective view of the underside of flexure 22 for use with microactuator 30 of the present invention. Flexure 22 is formed of a non-conductive polyimide material such as Kapton, for example, and forms the substrate of a flex circuit including conductive coil 62 connected to current-providing source 63, and standoffs 64, 66, 68 and 70. Standoffs 64, 66, 68 and 70 are aligned with respective standoffs 54, 56, 58 and 60 of microactuator 30 to apply pre-load force to microactuator 30 as it carries slider 24 (FIG. 3). In addition, conductive leads 72, 74, 76 and 78 are provided to electrically contact transducing head 26 carried by slider 24 (FIG. 3). Coil 62 and data leads 72, 74, 76 and 78 are formed of a conductive material such as copper.

Standoffs 64, 66, 68 and 70 are preferably formed of copper, or alternatively of a material such as nickel. In some embodiments, standoffs 64, 66, 68 and 70 may be formed with sufficient thickness so as to render standoffs 54, 56, 58 and 60 on microactuator 30 (FIG. 3) unnecessary. The total standoff height between magnets 52 and 53 and coil 62 is typically about 10 to 100 micro-meters ($\mu$m), with an exemplary height of 50 $\mu$m in one embodiment. Flexure 22 is typically about 50 $\mu$m thick, and may be made as thin as about 25 $\mu$m with some trade-off in durability. Coil 62 is typically about 20 $\mu$m thick.

FIG. 5 is a perspective view of microactuator 30 of the present invention attached to the underside of flexure 22 for use in a disc drive. Flexure 22 includes ferromagnetic keeper 82 formed on its top surface opposite coil 62 (FIG. 5) above magnets 52 and 53 located in tub 40 of microactuator 30 (FIG. 3). A vertically arranged magnetic circuit is thereby formed from the bottom keeper (ferromagnetic lining of tub 40), magnets 52 and 53, an airgap formed by the spacing between magnets 52 and 53 and coil 62, the windings of coil 62 itself, flexure 22 and top keeper 82. This vertically arranged magnetic circuit is shown schematically in FIG. 7, and its magnetic characteristics are discussed in more detail below in the discussion of FIG. 7. Keeper 82 may be plated on the polyimide substrate of flexure 22 or adhesively bonded thereto. In an alternate embodiment, keeper 82 may be located on the bottom surface of flexure 22, with an additional insulating polyimide layer on the bottom of keeper 82 to insulate it from coil 62.

Figure 6:
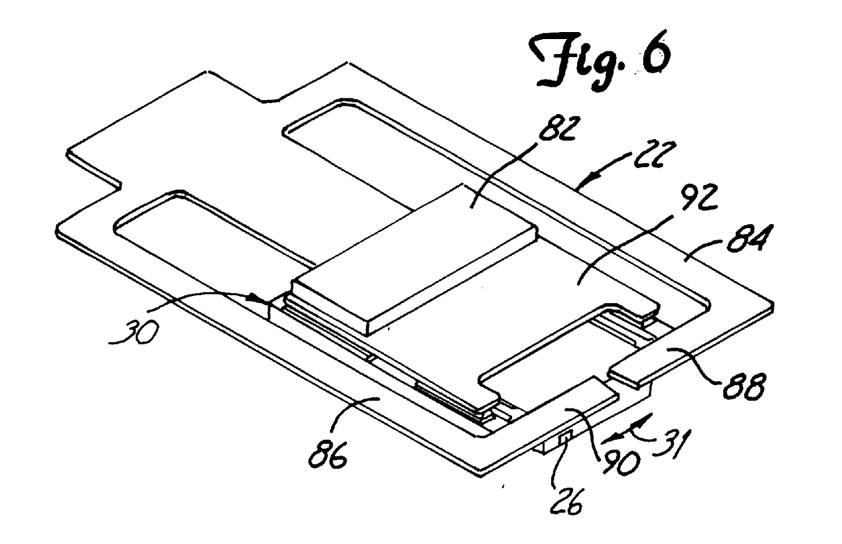
FIG. 6 is a perspective view of the microactuator of the present invention attached to the flex circuit for use in a disc drive.

Flexure 22 is shaped to include arms 84 and 86 and cross beams 88 and 90 for supporting data leads 72, 74, 76 and 78, and central portion 92 for supporting coil 62 and standoffs 64, 66, 68 and 70. Pre-load force is applied in a preferred embodiment to central portion 92 of flexure 22 by load beam 18 (FIG. 2). The arrangement of flexure 22 and the design of microactuator 30 are such that operation of microactuator 30 by circulating current through the windings of coil 62 results in cross-track movement of slider 24 in a horizontal plane generally parallel to the surface of the disc, in the direction of arrows 31, with the movement being permitted by the flexibility of beam springs 33 and 35 (FIG. 3). Outer preloading bars 32 and 34 having standoffs 54, 56, 58 and 60 thereon effectively form the stator of the motor, with magnets 52 and 53, slider bond pad 42, slider 24, flexible beams 33 and 35 and inner alignment clips 36 and 38 effectively forming the rotor of the motor (FIG. 3). Thus, lateral movement of magnets 52 and 53 affects the cross-track (horizontal) position of slider 24 with respect to outer preloading bars 32 and 34 and standoffs 54, 56, 58 and 60, and also with respect to flexure 22 and to the tracks of the disc.

Figure 7:
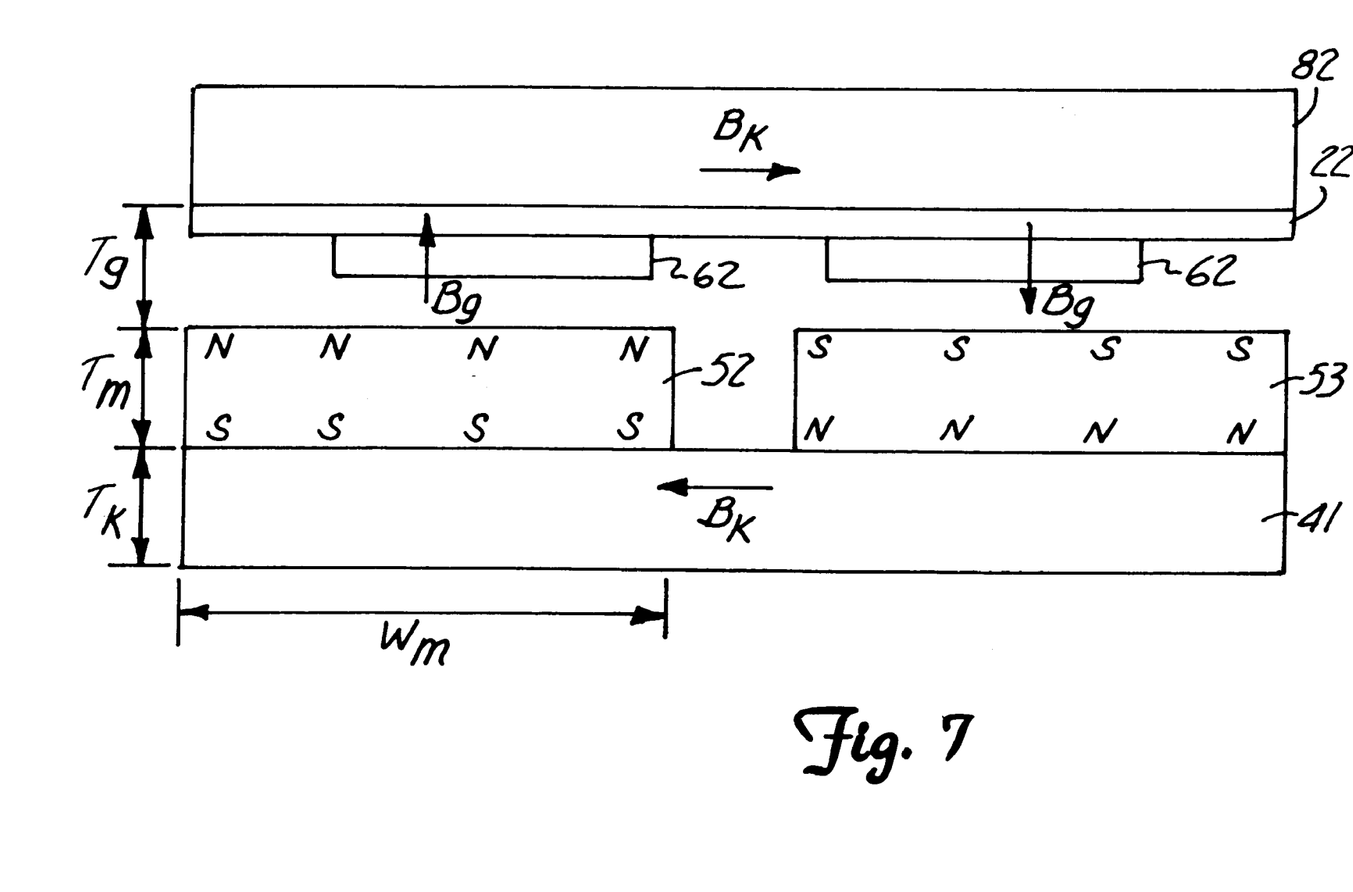
FIG. 7 is a layer diagram illustrating the vertical magnetic circuit formed by the microactuator and flex circuit of the present invention.

FIG. 7 is a layer diagram illustrating the vertical magnetic circuit formed by bottom ferromagnetic keeper 41, magnets 52 and 53, coil windings 62, flexure 22 and keeper 82 of the present invention. A current flowing through coil windings 62 interacts with the magnetic field in the airgap between magnets 52 and 53 and top keeper 82, so that magnetic flux flows in a path illustrated by the arrows in FIG. 7 referred to as $B_g$ (for flux in the airgap) and $B_k$ (for flux in the keepers). This interaction causes a force to be exerted on magnets 52 and 53 in a lateral direction (across the tracks of the disc), the force being controllable to achieve high resolution movement for fine positioning of the microactuator rotor with respect to the tracks of the disc.

The actuation force achievable by the magnetic circuit shown in FIG. 7 is governed by the Lorentz equation, with the current through coil 62 flowing at a 90° angle to the airgap flux ($B_g$), given as:

$$F_y = NIB_g L_m$$

where $F_y$ is the actuation force, N is the number of coil traverses across the face of magnets 52 and 53, I is the current in the coil, $B_g$ is the flux density in the airgap, and $L_m$ is the length of the faces of magnets 52 and 53 (into the paper in FIG. 7).

In addition to the actuation force, there is a force of attraction between magnets 52 and 53 and top keeper 82, given as:

$$F_z = \frac{AB_g^2}{2\mu_0}$$

where $F_z$ is the attraction force, A is the area of the faces of magnets 52 and 53, $B_g$ is the airgap flux density, and $\mu_0$ is the permeability of free space.

An actuation stroke can be determined from the designed resonant frequency of the microactuator and the actuation force achieved. The microactuator resonant frequency is generally controlled by the servo system of the disc drive, and is also affected by the mass of the microactuator rotor and the offtrack stiffness of the beams. In an exemplary embodiment, a resonance target frequency is 1000 Hz±150 Hz, with a rotor mass of 1.8 milli-grams and a beam offtrack stiffness at 1150 Hz of 93.9 Newtons per meter. A table of actuation stroke and attraction force for the 1000 Hz±150 Hz resonance frequency, where the magnet faces have a length of 527 μm and a width of 800 μm, is shown below:

| Gap Flux Density ($B_g$) | Actuation Stroke | Attraction Force |
|---|---|---|
| 0.2 Tesla | 3.95 μm | 0.68 gmf |
| 0.4 Tesla | 7.90 μm | 2.73 gmf |
| 0.6 Tesla | 11.9 μm | 6.14 gmf |
| 0.8 Tesla | 15.8 μm | 10.9 gmf |

As can be seen from the table above, large actuation strokes are achieved with rather significant vertical attraction forces between the magnets and the top keeper. The beam springs of the microactuator must be designed to support both this vertical attraction force and the vertical pre-load force applied to the slider with minimal vertical deflection. To accomplish this, the middle of the span of the beam springs is made to coincide with the net loading point of the microactuator. The net loading point is the point where the bending moments from the air-bearing pre-load force and the magnetic attraction force sum to zero. For example, where a layout distance is defined as the distance from the center of the magnets to the center of application of pre-load force to the slider, a microactuator design for 2.73 gmf pre-load force and 0.4 Tesla flux density places the net loading point halfway along the layout distance. A microactuator design for 3.07 gmf pre-load force and 0.6 Tesla flux density places the net loading point at one-third of the layout distance (closer to the magnets than the slider). A microactuator design for 2.73 gmf pre-load force and 0.8 Tesla flux density places the net loading point at one-fifth of the layout distance (closer to the magnets than the slider). Beam springs for other combinations of air-bearing pre-load and magnetic attraction forces maybe laid out in a similar manner.

In the force equations given above, the airgap flux density ($B_g$) is given as:

$$B_g = \frac{B_r}{\left(1 + \frac{T_g}{T_m}\right)}$$

where $B_r$ is the remanant magnetization of the magnetic material of magnets 52 and 53, $T_g$ is the thickness of the airgap between magnets 52 and 53 and top keeper 82, including open space, coil windings 62 and flexure 22, and $T_m$ is the thickness of magnets 52 and 53.

Figure 13:
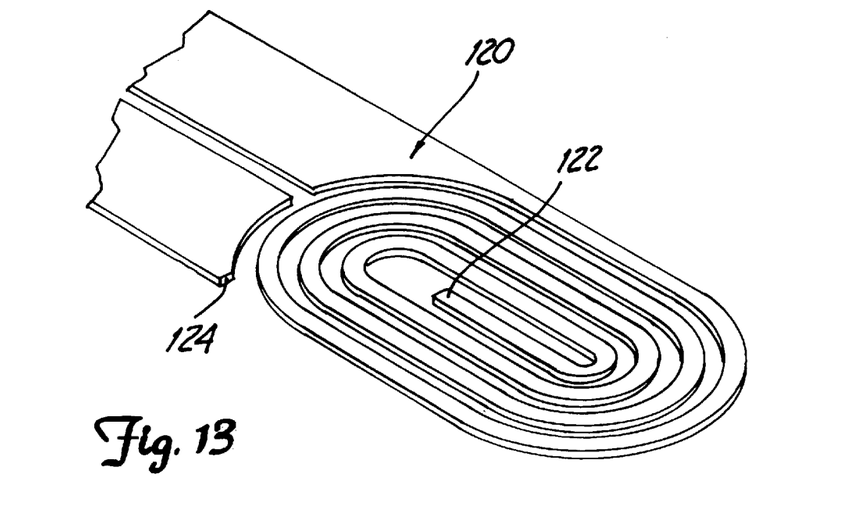
FIG. 13 is a perspective view of a first layer of a dual-layer coil according to an alternate embodiment of the present invention.
Figure 14:
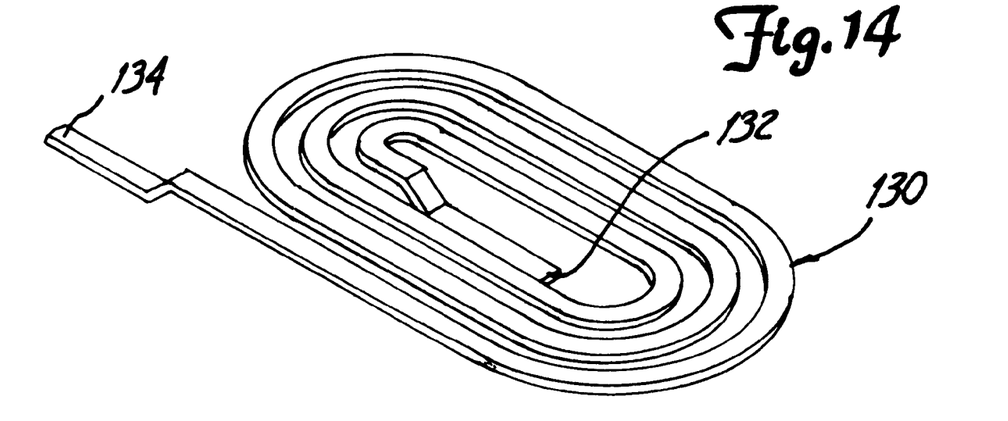
FIG. 14 is a perspective view of a second layer of a dual-layer coil according to an alternate embodiment of the present invention.

The thickness of the airgap is affected by several factors, such as the thickness of flexure 22, the placement of top keeper 82 on the top or bottom of flexure 22, and the number of coil layers (that is, whether a single-layer coil or a dual-layer coil such as is shown in FIGS. 13 and 14 is used). The airgap thickness in various embodiments is as follows:

| Substrate Thickness | Keeper Placement | Coil Layers | Airgap Thickness |
|---|---|---|---|
| 50 μm | Top | 2 | 110 μm |
| 25 μm | Top | 2 | 85 μm |
| 50 μm | Top | 1 | 80 μm |
| Any | Bottom | 2 | 70 μm |
| 25 μm | Top | 1 | 55 μm |
| Any | Bottom | 1 | 40 μm |

Figure 11:
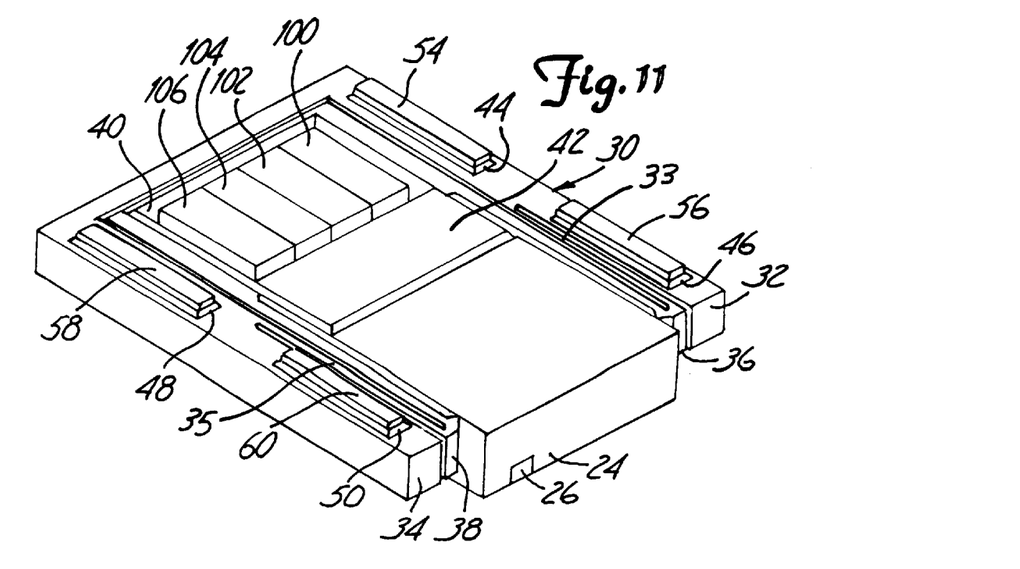
FIG. 11 is a perspective view of an alternate microactuator according to the present invention implementing four magnets.
Figure 12:
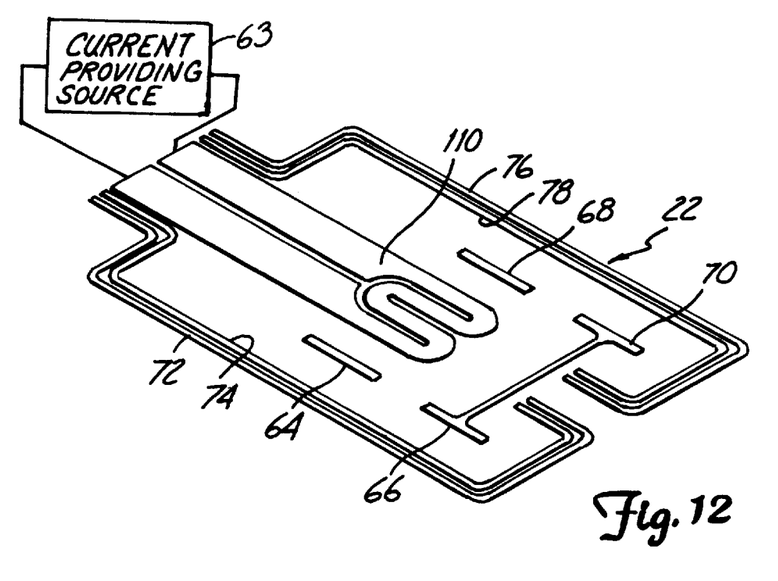
FIG. 12 is a perspective view of the underside of an alternate flex circuit for use with the microactuator utilizing four magnets as shown in FIG. 9.

The thickness of keepers 41 and 82 are determined by the requirement of carrying the flux linking the magnetic circuit without saturating. This relationship is expressed as:

$$T_k = W_m \frac{B_g}{B_s}$$

where $T_k$ is the thickness of keepers 41 and 82, $W_m$ is the width of magnets 52 and 53 (across the page in FIG. 7), and $B_s$ is the saturation moment of the material used to form keepers 41 and 82. Thus, it can be appreciated that a design with a set of four magnets requires only half the keeper thickness of a design with two magnets, since each magnet face is half as wide. Since the wafer package thickness of the microactuator is limited to about 200 μm, and a typical airgap thickness is about 80 μm (see table above), a reduction in keeper thickness is advantageous in some embodiments. This alternate design is shown in FIGS. 11 and 12 and is discussed in more detail below. In addition, the thickness of magnets 52 and 53 may be reduced while maintaining a high actuation stroke by utilizing magnetic materials with high remanence characteristics. In general, an increase in magnetic remanence of magnets 52 and 53 enables a decrease in the thickness of magnets 52 and 53 while maintaining a constant airgap flux density and actuation force. The table shown below illustrates the remanence of several potential magnetic materials:

| Material | Remanence |
|---|---|
| Ceramic | 0.40 Tesla |
| Neodymium Iron Boron | 1.27 Tesla |
| Samarium Cobalt | 1.09 Tesla |

Ceramic magnets are formed by particles of strontium ferrite embedded in a ceramic matrix. Ceramic magnets and Samarium Cobalt magnets are able to withstand process temperatures of 220° C. typically experienced in solder reflow ovens, enabling soldered attachment to be utilized to connect microactuator substrate 30 to flexure 22. Neodymium iron boron is limited to process temperatures below 150° C., requiring flexure 22 to be attached to microactuator substrate 30 by mechanical bonding with epoxy, for example.

Figure 8:
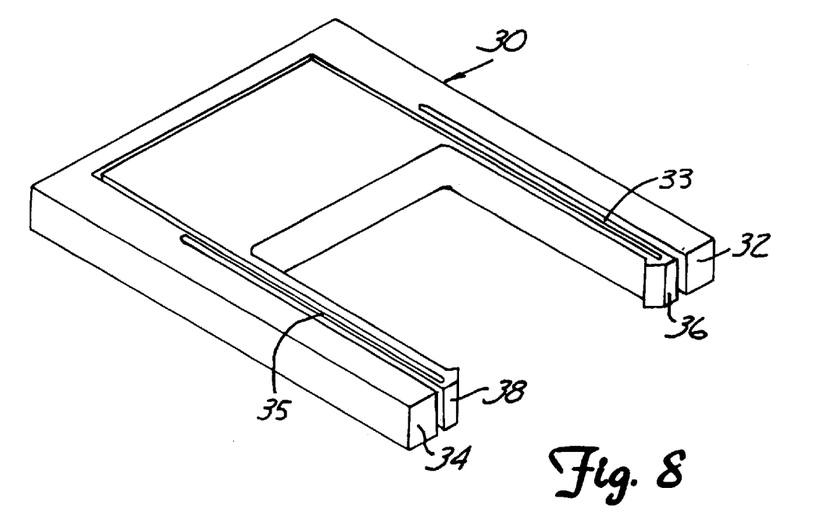
FIGS. 8–10 are perspective views of various phases of formation of the microactuator according to the present invention.
Figure 9:
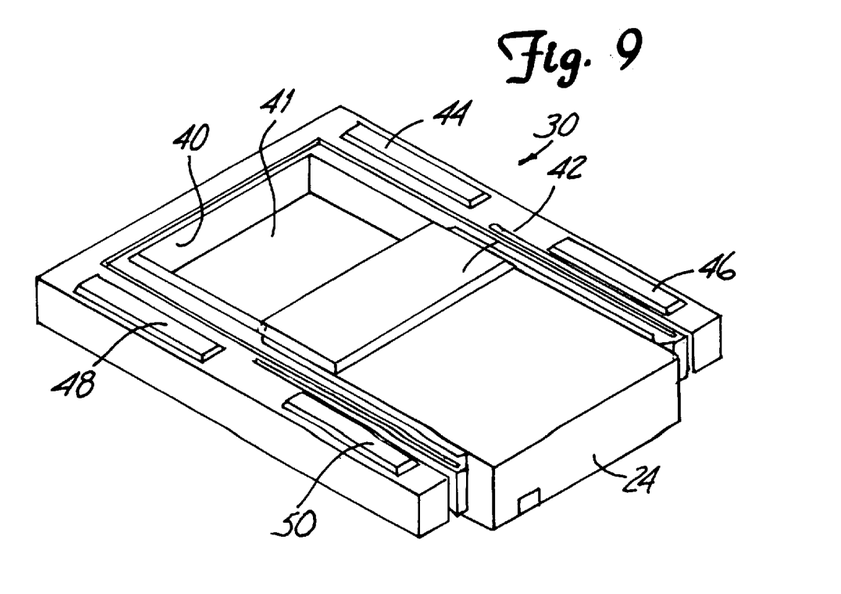
Figure 10:
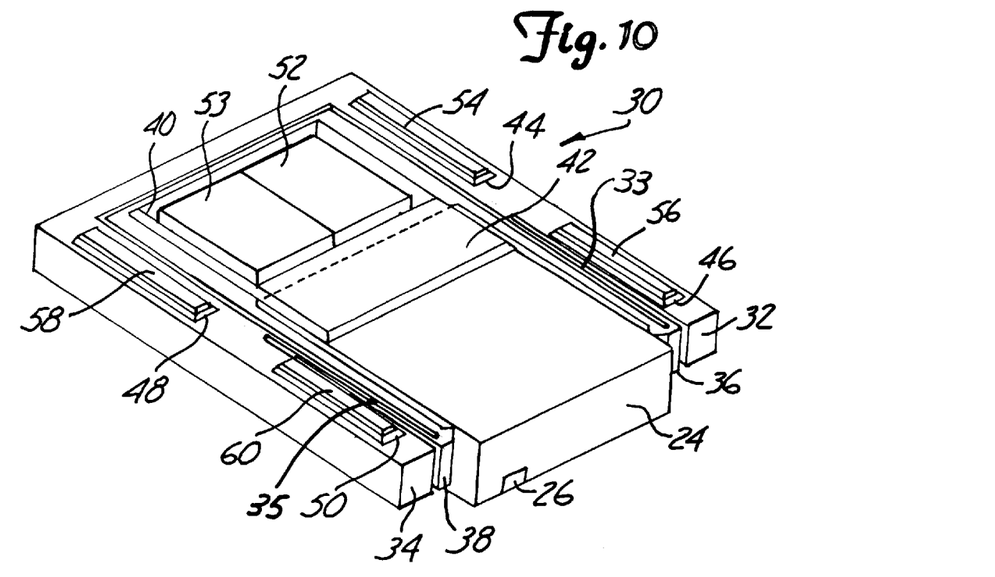

FIGS. 8–10 are perspective views of various phases of formation of microactuator 30, illustrating the novel formation process of microactuator 30 according to the present invention. The substrate of microactuator 30 is composed of a high-strength wafer substrate material such as molybdenum or cold-rolled titanium, or alternatively of a conventional wafer substrate material such as silicon. As shown in FIG. 8, the outline of microactuator 30 and the shapes of outer preloading bars 32 and 34, flexible beam springs 33 and 35 and inner alignment clips 36 and 38 are etched into the wafer substrate by a method such as deep trench reactive ion etching (DTRIE) to achieve the desired feature resolution. The substrate of microactuator 30 is then coated with a release layer which is etched to form a wet etching mask. Further wet etching is then performed to form features as described below.

As shown in FIG. 9, tub 40 is formed in the substrate of microactuator 30, and is plated with a ferromagnetic keeper 41 composed of a material such as cobalt-iron, for example. In an exemplary embodiment, tub 40 is etched to a depth of about 100 μm. Structural bond pad 42 is formed on keeper 41 to extend from the edge of tub 40, for attachment to slider 24 (FIG. 3) to support slider 24 between inner alignment clips 36 and 38. Standoff bases 44, 46, 48 and 50 are plated on outer preloading bars 32 and 34.

As shown in FIG. 10, magnets 52 and 53 are installed in tub 40 on keeper 41. Magnets 52 and 53 are attached to keeper 41 by known methods such as adhesive or glass bonding. Standoffs 54, 56, 58 and 60 are plated on respective standoff bases 44, 46, 48 and 50 to be borne upon so as to apply pre-load force to microactuator 30 as it supports slider 24. Standoffs 54, 56, 58 and 60 may be formed of copper in an exemplary embodiment, and are designed to be attached to corresponding standoffs on the underside of flexure 22 (FIG. 5) in a preferred arrangement of microactuator 30, by an attachment method such as soldering or another method known in the art. Attachment between flexure 22 and standoffs 54, 56, 58 and 60 on outer preloading bars 32 and 34 forms the stator of the microactuator motor.

In an alternative preferred embodiment, tub 40 is initially formed in the wafer substrate by a method such as DTRIE etching, coincident with the process of forming the outline of microactuator 30 and the shapes of outer preloading bars 32 and 34, flexible beam springs 33 and 35 and inner alignment clips 36 and 38. Keeper 41 is cut from a sheet of ferromagnetic alloy such as cobalt-iron, and keeper 41 and magnets 52 and 53 are formed as a separate assembly and bonded to the wafer substrate in tub 40. In one embodiment, keeper 41 is bonded around its edges to the side walls of tub 40.

FIG. 11 is a perspective view of an alternate microactuator design implementing four magnets 100, 102, 104 and 106 in tub 40. Other than the provision of four magnets rather than two, the microactuator design pictured in FIG. 11 is identical to microactuator 30 shown in FIG. 3. As discussed above, providing four magnets 100, 102, 104 and 106 enables the keeper thickness to be reduced, which may be advantageous in some embodiments of the invention, particularly if vertical space between discs is at a premium.

FIG. 12 is a perspective view of the underside of an alternate flexure 22 for use with the microactuator utilizing magnets 100, 102, 104 and 106 as shown in FIG. 11. Flexure 22 pictured in FIG. 11 is identical to the flexure of FIG. 5 except that the coils are realized by serpentine coils 110, which traverse the length of magnets 100, 102, 104 and 106 four times. The additional coil traverses keep the actuation force at a desired level for the increased number of magnets; that is, the number of coil traverses per magnet is maintained.

FIG. 13 is a perspective view of a first layer 120, and FIG. 14 is a perspective view of a second layer 130, of an alternate dual-layer coil pattern for use with the microactuator of the present invention. The dual-layer coil pattern is realized by spiraling conductor patterns vertically spaced from one another by an insulating layer, which is not shown in FIGS. 13 and 14 for the sake of clarity. First layer 120 has a center point 122 for attachment to center point 132 of second layer 130. Similarly, second layer 130 has side point 134 for attachment to side point 124 of first layer 120. These attachment points are the only places where first layer 120 and second layer 130 are connected through the insulating layer between them. The insulating layer may be provided by flexure 22 (FIG. 5) itself, or by an additional layer of insulating material between first layer 120 and second layer 130. The multiple layers of the coils allow a significantly lower operating current through the coils, which could be advantageous and save on the cost of components in some embodiments. This concept is illustrated in the table of current ratings for different coil types shown below:

| Coil Type | Resistance | Current | NI Product |
|---|---|---|---|
| Single layer, one turn (FIG. 7) | 8.15 milli-Ohms | 1919 milli-Amps | 3.84 Amp-Lengths |
| Single layer, serpentine (FIG. 11) | 38.8 milli-Ohms | 879 milli-Amps | 3.52 Amp-Lengths |
| Dual layer, seven turns (FIGS. 12 & 13) | 462 milli-Ohms | 265 milli-Amps | 3.71 Amp-Lengths |

In view of the microactuator design options explained above, it will be apparent to one skied in the art that a number of magnetic microactuator designs may be implemented according to the present invention. Performance characteristics for three exemplary embodiments are shown in the table below:

| Magnetic Material | Number of Magnets | Top keeper thickness | Bottom keeper thickness | Stroke (1000 Hz resonance) |
|---|---|---|---|---|
| Ceramic | 2 | 148 μm | 37 μm | 4.8 μm |
| Samarium Cobalt | 2 | 40 μm | 100 μm | 13.0 μm |
| Samarium Cobalt | 4 | 201 μm | 50 μm | 11.9 μm |

In the above table, the top keeper is formed of nickel, with a saturation moment of 0.6 Tesla, and the bottom keeper is formed of cobalt-iron, with a saturation moment of 2.4 Tesla. In an alternative embodiment, the t op keeper may also be formed of cobalt-iron, which would reduce its thickness significantly—the above description has assumed a nickel top keeper due to material s limitations imposed by flex circuit vendors. As can b e seen, the microactuation stroke increases significantly when a high remanence magnetic material is used. The four magnet design trades off some microactuation stroke for a reduction in keeper thickness.

Although the present invention has been described with reference to preferred embodiments, workers skilled in the art will recognize that changes may be made in form and detail without departing from the spirit and scope of the invention.

What is claimed is:

1. A disc drive having a recording disc rotatable about an axis, a slider carrying a transducing head for transducing data with the disc, and a dual-stage actuation assembly supporting the slider to position the transducing head adjacent a selected radial track of the disc, the dual-stage actuation assembly comprising:

a movable actuator arm controlled by an actuator motor:

a suspension assembly supported by the actuator arm, the suspension assembly including a flexure;

a microactuator comprising a stator attached to the flexure and a rotor supporting the slider, the rotor being movable with respect to the stator in a first horizontal plane generally parallel to a surface of the disc;

a magnetic circuit having a bottom ferromagnetic keeper, a plurality of magnets, a patterned conductive coil and a top ferromagnetic keeper vertically arranged in the plurality of planes substantially parallel to the first horizontal plane, the magnets being operable in response to the current being provided to the conductive coil to move laterally and thereby cause movement of the microactuator rotor in the first horizontal plane generally parallel to the surface of the disc; and wherein the top ferromagnetic keeper is located on a top surface of the flexure opposite the microactuator and the patterned conductive coil is suspended from an underside of the flexure between the top ferromagnetic keeper and the plurality of magnets.

2. The disc drive of claim 1, wherein the patterned conductive coil comprises a dual-layer coil suspended between the top ferromagnetic keeper and the plurality of magnets.

3. The disc drive of claim 1, wherein the plurality of magnets comprises two magnets.

4. The disc drive of claim 1, wherein the plurality of magnets comprises four magnets.

5. A disc drive having a recording disc rotatable about an axis, a slider carrying a transducing head for transducing data with the disc, and a dual-stage actuation assembly supporting the slider to position the transducing head adjacent a selected radial track of the disc, the dual-stage actuation assembly comprising:

a movable actuator arm controlled by an actuator motor:

a suspension assembly supported by the actuator arm, the suspension assembly including a flexure;

a microactuator comprising a stator attached to the flexure and a rotor supporting the slider, the rotor being movable with respect to the stator in a first horizontal plane generally parallel to a surface of the disc;

a magnetic circuit having a bottom ferromagnetic keeper, a plurality of magnets, a patterned conductive coil and a top ferromagnetic keeper vertically arranged in the plurality of planes substantially parallel to the first horizontal plane, the magnets being operable in response to the current being provided to the conductive coil to move laterally and thereby cause movement of the microactuator rotor in the first horizontal plane generally parallel to the surface of the disc; and wherein the bottom ferromagnetic keeper is located in a tub in the microactuator and the plurality of magnets are attached to the bottom ferromagnetic keeper.

6. A disc drive having a recording disc rotatable about an axis, a slider carrying a transducing head for transducing data with the disc, and a dual-stage actuation assembly supporting the slider to position the transducing head adjacent a selected radial track of the disc, the dual-stage actuation assembly comprising:

a movable actuator arm controlled by an actuator motor:

a suspension assembly supported by the actuator arm, the suspension assembly including a flexure;

a microactuator comprising a stator attached to the flexure and a rotor supporting the slider, the rotor being movable with respect to the stator in a first horizontal plane generally parallel to a surface of the disc;

a magnetic circuit having a bottom ferromagnetic keeper, a plurality of magnets, a patterned conductive coil and a top ferromagnetic keeper vertically arranged in the plurality of planes substantially parallel to the first horizontal plane, the magnets being operable in response to the current being provided to the conductive coil to move laterally and thereby cause movement of the microactuator rotor in the first horizontal plane generally parallel to the surface of the disc; and wherein the microactuator stator comprises a plurality of outer preloading bars attached to the flexure and the microactuator rotor comprises a plurality of inner alignment clips that are movable with respect to the outer preloading bars, a slider bond pad supporting the slider, the bottom ferromagnetic keeper and the plurality of magnets, the outer preloading bars and the inner alignment clips being connected by flexible beam springs.

7. The disc drive of claim 6, further comprising a first plurality of standoffs on the outer preloading bars of the microactuator.

8. The disc drive of claim 7, further comprising a second plurality of standoffs on the flexure contacting corresponding ones of the first plurality of standoffs on the outer preloading bars of the microactuator.

9. The disc drive of claim 6, further comprising a plurality of standoffs on the flexure contacting the outer preloading bars of the microactuator.

10. The disc drive of claim 6, wherein the suspension assembly includes a load beam applying force to the flexure to impart pre-load force to the slider.

11. The disc drive of claim 10, wherein a mid-span of the flexible beam springs is located at a net loading point where a bending moment from the force applied to the flexure by the load beam and a magnetic attraction force between the magnets and the top ferromagnetic keeper are equal.

12. A disc drive having a recording disc rotatable about an axis, a slider carrying a transducing head for transducing data with the disc, and a dual-stage actuation assembly supporting the slider to position the transducing head adjacent a selected radial track of the disc, the dual-stage actuation assembly comprising:

a movable actuator arm controlled by an actuator motor;

a suspension assembly supported by the actuator arm, the suspension assembly including a flexure;

a microactuator comprising a stator attached to the flexure and a rotor supporting the slider, the rotor being movable with respect to the stator in a first horizontal plane generally parallel to a surface of the disc;

a magnetic circuit arranged vertically in a plurality of planes substantially parallel to the first horizontal plane, including a plurality of magnets in a second horizontal plane substantially parallel to the first horizontal plane and a patterned conductive coil in a third horizontal plane substantially parallel to the first and second horizontal planes, to move the microactuator rotor in the first horizontal plane generally parallel to the surface of the disc in response to a current provided to the magnetic circuit; and wherein the microactuator stator comprises a plurality of outer preloading bars attached to the flexure and the microactuator rotor comprises a plurality of inner alignment clips that are movable with respect to the outer preloading bars, a slider bond pad supporting the slider and the plurality of magnets, the outer preloading bars and the inner alignment clips being connected by flexible beam springs.

13. The disc drive of claim 12, further comprising a first plurality of standoffs on the outer preloading bars of the microactuator.

14. The disc drive of claim 13, further comprising a second plurality of standoffs on the flexure contacting corresponding ones of the first plurality of standoffs on the outer preloading bars of the microactuator.

15. The disc drive of claim 12, further comprising a plurality of standoffs on the flexure contacting the outer preloading bars of the microactuator.

16. The disc drive of claim 12, wherein the suspension assembly includes a load beam applying force to the flexure to impart pre-load force to the slider.

17. The disc drive of claim 12, wherein the plurality of magnets comprises two magnets.

18. The disc drive of claim 12, wherein the plurality of magnets comprises four magnets.

* * * * *